(12) United States Patent
Royer et al.

(10) Patent No.: US 6,900,267 B2
(45) Date of Patent: May 31, 2005

(54) METHODS OF CO$_2$-ASSISTED REACTIVE EXTRUSION

(75) Inventors: Joseph Royer, Greenville, SC (US); Joseph M. DeSimone, Chapel Hill, NC (US); George W. Roberts, Raleigh, NC (US); Saad A. Khan, Cary, NC (US)

(73) Assignees: North Carolina State University, Raleigh, NC (US); The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 10/317,506

(22) Filed: Dec. 12, 2002

(65) Prior Publication Data

US 2003/0171495 A1 Sep. 11, 2003

Related U.S. Application Data

(60) Provisional application No. 60/341,081, filed on Dec. 12, 2001.

(51) Int. Cl.[7] .......................... C08F 255/06; C08J 9/00
(52) U.S. Cl. ....................... 525/64; 525/69; 525/71; 525/171; 525/177; 525/179; 525/445; 525/438; 525/449; 521/97
(58) Field of Search .................. 525/64, 69, 71, 525/171, 177, 179, 445, 438, 449; 521/97

(56) References Cited

U.S. PATENT DOCUMENTS

| | | |
|---|---|---|
| 4,501,859 A | 2/1985 | Newman et al. |
| 5,158,986 A | 10/1992 | Cha et al. ................. 521/82 |

(Continued)

FOREIGN PATENT DOCUMENTS

DE 198 00 166 7/1999 .......... C08L/67/02

OTHER PUBLICATIONS

Areizaga et al., "Galvinoxyl as Scavenger in the Radical Polymerization of Styrene Initiated by AIBN," *Makromol. Chem., Macromol. Symp*, 20/21: 77–82 (1988).

Asano et al., "Activation and Reaction Volumes in Solution," *Chemical Reviews*, 78:4 407–489 (1978).

Elkovitch et al., "Supercritical Carbon Dioxide Assisted Blending of Polystyrene and Poly(Methyl Methyacrylate)," *Polymer Engineering and Science*, 39:10 2075–2084 (1999).

Sheppard et al., "The Selection and Use of Free Radical Initiators," *Polymer Engineering and Science*, 19:9 597–606 (1979).

Tzoganakis, C., "Reactive Extrusion of Polymers: A Review," *Advances in Polymer Technology*, 9:4 321–330 (1989).

(Continued)

*Primary Examiner*—James J. Seidleck
*Assistant Examiner*—Olga Asinovsky
(74) *Attorney, Agent, or Firm*—Meyers Bigel Sibley & Sajovec, P.A.

(57) ABSTRACT

Methods of carrying out a reactive extrusion processes are described that include combining at least one polymer, oligomer, or combination thereof, a carbon dioxide containing fluid, and at least one reactant in an extruder to form a mixture such that the carbon dioxide containing fluid comes into intimate contact with the at least one polymer, oligomer, or combination thereof and assists in a reaction between the at least one polymer, oligomer, or combination thereof and the at least one reactant, and wherein the at least one polymer, oligomer, or combination thereof is modified upon reaction with the at least one reactant.

41 Claims, 1 Drawing Sheet

U.S. PATENT DOCUMENTS

| | | |
|---|---|---|
| 5,173,541 A | 12/1992 | Chen, Sr. et al. |
| 5,180,797 A | 1/1993 | Austin et al. |
| 5,264,541 A | 11/1993 | Yuo et al. |
| 5,290,747 A | 3/1994 | Yuo et al. |
| 5,298,597 A | 3/1994 | Yuo et al. |
| 5,298,598 A | 3/1994 | Yuo et al. |
| 5,439,711 A | 8/1995 | Vu et al. |
| 5,461,094 A | 10/1995 | Yoo et al. |
| 5,468,837 A | 11/1995 | Wautier |
| 5,635,568 A | 6/1997 | Plochocka et al. |
| 5,656,718 A | 8/1997 | Wautier et al. |
| 5,770,652 A | 6/1998 | Richards et al. |
| 5,801,224 A | 9/1998 | Narayan et al. |
| 5,859,263 A | 1/1999 | Ghorpade et al. |
| 5,945,461 A * | 8/1999 | Gosiewski et al. ......... 521/123 |
| 5,952,433 A | 9/1999 | Wang et al. |
| 5,969,052 A | 10/1999 | Mumick et al. |
| 5,969,089 A | 10/1999 | Narayan et al. |
| 6,022,941 A | 2/2000 | Mestanza et al. |
| 6,083,585 A | 7/2000 | Cahill et al. |
| 6,087,468 A | 7/2000 | Hoeks et al. |
| 6,117,947 A | 9/2000 | Wang et al. |
| 6,153,680 A | 11/2000 | Shah et al. |
| 6,160,037 A | 12/2000 | Leugs et al. |
| 6,225,406 B1 | 5/2001 | Wang et al. |
| 6,228,213 B1 | 5/2001 | Hanna et al. |
| 6,265,493 B1 * | 7/2001 | Chung et al. ............... 525/247 |
| 6,277,768 B1 | 8/2001 | Mumick et al. |
| 6,323,251 B1 * | 11/2001 | Perez et al. ................. 521/134 |

OTHER PUBLICATIONS

Japon S. et al; *Recycling of Poly (Ethylene Terephthalate) Into Closed–Cell Foams*; Polymer Engineering & Science, Society of Plastics Engineers, vol. 40., No. 8. (Aug. 2000), pp 1942–1952.

Kumpf, R.J. et al; *Reactive Processing of Engineering Thermoplastics*; Trends in Polymer Science, Elsevier Science Publishers B.V. Amsterdam, NL, vol. 3, No. 4, (Apr. 1995) pp 132–138.

PCT International Search Report for PCT/US 02/39756, Dec. 12, 2002.

* cited by examiner

METHODS OF CO$_2$-ASSISTED REACTIVE EXTRUSION

RELATED APPLICATION

This application claims the benefit of U.S. Provisional Application Number 60/341,081, filed Dec. 12, 2001, the disclosure of which is incorporated herein by reference in its entirety.

FIELD OF THE INVENTION

The present invention relates to methods of reactive extrusion.

BACKGROUND OF THE INVENTION

Traditionally, extruders are used to melt, homogenize, and pump polymers through various dies. In the past couple of decades, extruders have found use in various polymer modification applications. See Costas Tzonganakis, "Reactive Extrusion of Polymers: A Review," Adv. in Polymer Tech. 9(4): 321–330 (1989).

For example, U.S. Pat. No. 6,228,213 to Hanna et al. proposes acid hydrolysis of cellulose in an extruder to form microcrystalline cellulose.

U.S. Pat. No. 6,117,947 to Wang et al. propose modifying poly(ethylene oxide) by grafting polar vinyl monomers, such as poly(ethylene glycol)methacrylates and 2-hydroxyethyl methacrylate, onto the poly(ethylene oxide) utilizing a reactive extrusion process.

U.S. Pat. No. 6,087,468 to Hoeks et al. proposes reactive extrusion of an organic salt branching agent with linear polycarbonate resin.

U.S. Pat. No. 6,022,941 to Mestanza et al. proposes the branching of polycarbonate by reactive extrusion using free radical chemistry.

U.S. Pat. No. 5,952,433 to Wang et al. proposes a method of grafting polar groups onto polyactides by reactive extrusion.

U.S. Pat. No. 4,501,859 to Newman et al. proposes continuous halogenation of polymers in an extruder-reactor. The polymer passes through three extruder-reactor zones under controlled conditions to achieve halogenation: feed, reaction, neutralization, and optionally a wash and exit zone.

There is a need in the art for improved reactive extrusion methods.

SUMMARY OF THE INVENTION

The present invention relates to carbon dioxide assisted reactive extrusion methods. Embodiments of the present invention provide improved reactive extrusion methods when compared to the conventional reactive extrusion methods described above. For example, embodiments of the present invention provide: enhanced removal of condensate molecules during polymerization and/or reaction; enhanced removal and, optionally, recycle of unreacted material during reactive processing; improved mixing and/or diffusion of polymeric blends, which can provide more uniform products; decreased size of segregated phases, which can allow smaller phases to be trapped via cross-linking and/or reactive blending; improved diffusivity of condensate molecules; improved mixing and/or diffusion of small molecules (e.g., reactants and initiators), which can provide more uniform products; and/or lowered processing temperatures, which can be particularly beneficial when processing temperature sensitive materials (e.g., anti-microbials or other biological agents that can be reactively incorporated into the polymeric system utilizing methods according to embodiments of the present invention).

According to embodiments of the present invention, a method of carrying out a reactive extrusion process includes combining at least one polymer, oligomer, or combination thereof, a carbon dioxide containing fluid, and at least one reactant in an extruder to form a mixture such that the carbon dioxide containing fluid comes into intimate contact with the at least one polymer, oligomer, or combination thereof and assists in a reaction between the at least one polymer, oligomer, or combination thereof and the at least one reactant, and wherein the at least one polymer, oligomer, or combination thereof is modified upon reaction with the at least one reactant.

According to other embodiments of the present invention, a method of carrying out a reactive extrusion process includes combining at least one first reactive component, at least one second reactive component, and a carbon dioxide containing fluid in an extruder to form a mixture such that the carbon dioxide containing fluid comes into intimate contact with the at least one first reactive component and the at least one second reactive component to assist in a reaction between the at least one first reactive component and the at least one second reactive component, and wherein the at least one first reactive component and the at least one second reactive component react and form a product therefrom.

DETAILED DESCRIPTION OF PREFERRED EMBODIMENTS

The present invention will now be described by the embodiments that follow. It should be understood that these embodiments are for the purposes of illustrating the invention, and do not limit the scope of the invention as defined by the claims.

In the present invention, the term "assisted" refers to one of several methods in which $CO_2$ may aid in the reactive extrusion process. These methods included, but are not limited to, viscosity reduction, enhanced polymer compatibly, enhanced polymer blending, improved dissolution of small molecules, improved polymer chain mobility, enhanced reaction rates and improved reaction product uniformity. The use of $CO_2$ may also aid in decreasing polymer domain size in a polymer blend which potentially can help selectively customize reactivity and physical properties.

In one aspect, the invention provides a method of carrying out a reactive extrusion process. The method includes combining at least one polymer, oligomer, or combination thereof, a carbon dioxide containing fluid, and at least one reactant in an extruder to form a mixture such that the carbon dioxide containing fluid comes into intimate contact with the at least one polymer, oligomer, or combination thereof and assists in a reaction between the at least one polymer, oligomer, or combination thereof and at least one reactant. In accordance with the invention, the at least one polymer, oligomer, or combination thereof is modified upon reaction with the at least one reactant. As described in greater detail herein, the methods of the invention may be carried out in a twin-screw or a single-screw extruder.

For the purposes of the invention, carbon dioxide is employed as a fluid in a liquid, gaseous, or supercritical phase. If liquid $CO_2$ is used, the temperature employed during the process is necessarily below 31° C. If gaseous $CO_2$ is used, it is preferred that the phase be employed at high pressure. As used herein, the term "high pressure" generally refers to $CO_2$ having a pressure from about 100 to about 400 bar. In one embodiment, the $CO_2$ is utilized in a "supercritical" phase. As used herein, "supercritical" means that a fluid medium is above its critical temperature and pressure, i.e., about 31° C. and about 71 bar for $CO_2$. The thermodynamic properties of $CO_2$ are reported in Hyatt, *J. Org. Chem.* 49: 5097–5101 (1984); therein, it is stated that the critical temperature of $CO_2$ is about 31° C.; thus the method of the present invention may be carried out at a temperature above 31° C. For the purposes of the invention, it is preferred to introduce $CO_2$ at a pressure ranging from about 100 bar to about 400 bar during extrusion. In certain embodiments of the invention, $CO_2$ may be introduced into a system at a pressure preferably ranging from about 100 bar to about 400 bar. As an example, the pressure may then drop to about 50 bar to about 30 bar subsequent to introduction of the $CO_2$. The methods of the invention may be carried out at temperatures ranging from about 20° C. to about 250° C.

The method of the invention may include other optional steps. For example, in one embodiment, the method further comprises the step of removing the carbon dioxide-containing fluid from the extruder by techniques known to one skilled in the art.

Various types of modified materials may be formed in accordance with the invention. In one embodiment, the modified at least one polymer, oligomer, or combination thereof is present as a foamed material. For the purposes, a "foamed" material may be interpreted as encompassing a "closed-cell" or an "open-cell" material. In another embodiment, the modified at least one polymer, oligomer, or combination thereof is present as a solid material.

The carbon dioxide-containing fluid may optionally include other components, the selection of which may be ascertained by one skilled in the art. For example, surfactants can be used. The surfactants which are employed by the processes of the invention are known to those skilled in the art. Preferably, the surfactants are non-ionic surfactants. Examples of suitable surfactants are set forth in U.S. Pat. Nos. 5,783,082; 5,589,105; 5,639,836; and 5,451,633 to DeSimone et al.; 5,676,705; and 5,683,977 to Jureller et al., the disclosures of which are incorporated herein by reference in their entirety. In general, the surfactant may encompass any macromolecule that serves to emulsify, that may be polymeric or non-polymeric.

Preferably, the surfactant has a segment that has an affinity for the material it comes in contact with, or, stated differently, a "$CO_2$-phobic segment". In embodiments employing a surfactant, the "$CO_2$-phobic" segment has an affinity for the polymer, oligomer, or combination thereof. Exemplary $CO_2$-phobic segments may comprise common lipophilic, oleophilic, and aromatic polymers, as well as oligomers formed from monomers such as ethylene, α-olefins, styrenics, acrylates, methacrylates, ethylene oxides, isobutylene, vinyl alcohols, acrylic acid, methacrylic acid, and vinyl pyrrolidone. The $CO_2$-phobic segment may also comprise molecular units containing various functional groups such as amides; esters; sulfones; sulfonamides; imides; thiols; alcohols; dienes; diols; acids such as carboxylic, sulfonic, and phosphoric; salts of various acids; ethers; ketones; cyanos; amines; quaternary ammonium salts; and thiozoles. Mixtures of any of these components can make up the "$CO_2$-phobic segment". If desired, the surfactant may comprise a plurality of "$CO_2$-phobic" segments. In such an embodiment, each segment could have an affinity for different polymers, oligomers, or combinations thereof that are employed.

If desired, the surfactant may comprise a segment that has an affinity for carbon dioxide, or a "$CO_2$-philic" segment. Exemplary $CO_2$-philic segments may include a halogen (e.g., fluoro or chloro)-containing segment, a siloxane-containing segment, a branched polyalkylene oxide segment, or mixtures thereof. Examples of "$CO_2$-philic" segments are set forth in U.S. Pat. Nos. 5,676,705; and 5,683,977 to Jureller et al. If employed, the fluorine-containing segment is typically a "fluoropolymer". As used herein, a "fluoropolymer" has its conventional meaning in the art and should also be understood to include low molecular weight oligomers, i.e., those which have a degree of polymerization greater than or equal to two. See generally Banks et al., *Organofluorine Compounds: Principals and Applications* (1994); see also *Fluorine-Containing Polymers,* 7 Encyclopedia of Polymer Science and Engineering 256 (H. Mark et al. Eds. 2d Ed. 1985). Exemplary fluoropolymers are formed from monomers which may include fluoroacrylate monomers such as 2-(N-ethylperfluorooctane-sulfonamido)ethyl acrylate ("EtFOSEA"), 2-(N-ethylperfluorooctane-sulfonamido) ethyl methacrylate ("EtFOSEMA"), 2-(N-methylperfluorooctane-sulfonamido) ethyl acrylate ("MeFOSEA"), 2-(N-methylperfluorooctane-sulfonamido) ethyl methacrylate ("MeFOSEMA"), 1,1'-dihydroperfluorooctyl acrylate ("FOA"), 1,1'-dihydroperfluorooctyl methacrylate ("FOMA"), 1,1',2,2'-tetrahydroperfluoroalkylacrylate, 1,1',2,2'-tetrahydroperfluoroalkyl-methacrylate and other fluoromethacrylates; fluorostyrene monomers such as α-fluorostyrene and 2,4,6-trifluoromethylstyrene; fluoroalkylene oxide monomers such as hexafluoropropylene oxide and perfluorocyclohexane oxide; fluoroolefins such as tetrafluoroethylene, vinylidine fluoride, and chlorotrifluoroethylene; and fluorinated alkyl vinyl ether monomers such as perfluoro(propyl vinyl ether) and perfluoro(methyl vinyl ether). Copolymers using the above monomers may also be employed. Exemplary siloxane-containing segments include alkyl, fluoroalkyl, and chloroalkyl siloxanes. More specifically, dimethyl siloxanes and polydimethylsiloxane materials are useful. Mixtures of any of the above may be used. In certain embodiments, the "$CO_2$-philic" segment may be covalently linked to the "$CO_2$-phobic" segment.

Surfactants that are suitable for the invention may be in the form of, for example, homo, random, block (e.g., di-block, tri-block, or multi-block), blocky (those from step growth polymerization), and star homopolymers, copolymers, and co-oligomers. Exemplary homopolymers include, but are not limited to, poly(1,1'-dihydroperfluorooctyl acrylate) ("PFOA"), poly(1,1'-dihydro-perfluorooctyl methacrylate) ("PFOMA"), poly(2-(N-ethylperfluorooctane-sulfonamido)ethyl methacrylate) ("PEtFOSEMA"), and poly(2-(N-ethylperfluorooctane sulfonamido)ethyl acrylate) ("PEtFOSEA"). Exemplary block copolymers include, but are not limited to, polystyrene-b-poly(1,1-dihydroperfluorooctyl acrylate), polymethyl methacrylate-b-poly(1,1-dihydroperfluorooctyl methacrylate), poly(2-(dimethylamino)ethyl methacrylate)-b-poly(1,1-dihydroperfluorooctyl methacrylate), and a diblock copolymer of poly(2-hydroxyethyl methacrylate) and poly(1,1-dihydroperfluorooctyl methacrylate). Statistical copolymers of poly(1,1-dihydroperfluoro octyl acrylate) and polystyrene, along with poly(1,1-dihydroperfluorooctyl methacrylate) and poly(2-hydroxyethyl methacrylate) can also be used. Graft copolymers may be also be used and include, for example, poly(styrene-g-dimethylsiloxane), poly(methyl acrylate-g-1,1'dihydroperfluorooctyl methacrylate), and poly(1,1'-dihydroperfluorooctyl acrylate-g-styrene). Random copolymers may be employed and examples of such include, but are not limited to, copolymers or terpolymers of tetrafluoroethylene, vinylidene fluoride, hexafluoropropylene, chlorotrifluoroethylene, and ethylene. Other examples can be found in I. Piirma, *Polymeric Surfactants* (Marcel Dekker 1992); and G. Odian, *Principals of Polymerization* (John Wiley and Sons, Inc. 1991). It should be emphasized that non-polymeric molecules may be used such as perfluoro octanoic acid, sulfynols, perfluoro(2-propoxy propanoic) acid, fluorinated alcohols and diols, along with various fluorinated acids, ethoxylates, amides, glycosides, alkanolamides, quaternary ammonium salts, amine oxides, and amines. Commercially preferred surfactants include, for example those in the Zonyl® series sold by E. I. Du Pont de Nemours of Wilmington, Del. and those in the Fluorad® series sold by Minnesota Mining and Manufacturing of St. Paul, Minn. Mixtures of any of the above may be used. Various components which are suitable for the process of the invention are encompassed by the class of materials described in E. Kissa, *Fluorinated Surfactants: Synthesis, Properties, and Applications* (Marcel Dekker 1994). For the purposes of the invention, two or more surfactants may be employed in the invention. Edible surfactants may also be used.

Depending on the number of different type of polymers, oligomers, or combinations thereof which are present, the surfactant can comprise multiple blocks or segments which may be equal to the number of polymers or resins present in the blend. As an example, if two polymers or oligomers or combinations are present as a blend, the surfactant may comprise two blocks or segments wherein each has an affinity for each component. If three polymers, oligomers, or combinations thereof are employed, the surfactant may comprise three blocks or segments, and so on. In these embodiments, the surfactant may also include a "$CO_2$-philic" segment.

Although a number of examples of surfactants listed herein are in the form of block, random, or graft copolymers, it should be appreciated by those skilled in the art that other copolymers that are not block, random, or graft may be used.

If employed, the amount of surfactant that is used in the carbon dioxide-containing fluid may be selected from various values. Preferably, the carbon dioxide containing fluid includes from about 0.01 to about 1 percent by weight of the surfactant, and more preferably from about 0.1 to about 1 percent by weight. It should be appreciated that this amount depends on several factors including the stability of the surfactant and desired end product.

The carbon dioxide-containing fluid may include other optional components. Exemplary components include, but are not limited to, polymer modifiers, crosslinking agents, water, hydrogen, toughening agents, colorants, dyes, biological agents, rheology modifiers, plasticizing agents, flame retardants, antibacterial agents, flame retardants, and viscosity reduction modifiers. Co-solvents and co-surfactants may also be employed.

Exemplary co-solvents that could be used include, but are not limited to, alcohols (e.g., methanol, ethanol, and isopropanol); fluorinated and other halogenated solvents (e.g., chlorotrifluoromethane, trichlorofluoromethane, perfluoropropane, chlorodifluoromethane, and sulfur hexafluoride); amines (e.g., N-methyl pyrrolidone); amides (e.g., dimethyl acetamide); aromatic solvents (e.g., benzene, toluene, and xylenes); esters (e.g., ethyl acetate, dibasic esters, and lactate esters); ethers (e.g., diethyl ether, tetrahydrofuran, and glycol ethers); aliphatic hydrocarbons (e.g., methane, ethane, propane, n-pentane, and hexanes); oxides (e.g., nitrous oxide); olefins (e.g., ethylene and propylene); natural hydrocarbons (e.g., isoprenes, terpenes, and d-limonene); ketones (e.g., acetone and methyl ethyl ketone); organosilicones; alkyl pyrrolidones (e.g., N-methyl pyrrolidone); paraffins (e.g., isoparaffin); petroleum-based solvents and solvent mixtures; and any other compatible solvent or mixture that is available and suitable. Mixtures of the above co-solvents may be used.

Exemplary co-surfactants that may possibly be used include, but are not limited to, longer chain alcohols (i.e., greater than $C_8$) such as octanol, decanol, dodecanol, cetyl, laurel, and the like; and species containing two or more alcohol groups or other hydrogen bonding functionalities; amides; amines; and other like components. Suitable other types of materials that are useful as co-surfactants are well known by those skilled in the art, and may be employed in the process of the present invention. Mixtures of the above may be used. When employed, the co-surfactant may be in the form of a compatibilizer.

A number of different reactive extrusion processes can be encompassed by the invention. In one embodiment, the reactant is a grafting agent, and the grafting agent is grafted onto the at least one polymer, oligomer, or combination thereof.

A variety of grafting agents can be used in this embodiment. Examples of grafting agents include, without limitation, vinyl silanes, acrylic acid, acrylic esters, methacrylic acid, butyl acrylate, ethylhexyl acrylate, mixtures of acrylic acid and acrylates, dimethyl-amino ethyl methacrylate, hydroxyethyl methacryate, vinyl acetate, mixtures of vinyl acetate, maleic anhydride, p-methoxy acrylate, p-fluoro acrylate, p-cumylphenyl acrylate, N-methylacryloyl caprolactan, acrylonitrile, aryl vinyl monomers, fumaric acid, itaconic acid, citraconic acid, citraconic anhydride, alkenyl succinate anhydrides, dibutyl maleate, phenyl fumarate, nonoethyl maleate, fluorinated derivatives thereof, and mixtures thereof.

Examples of polymers, oligomers, or combinations thereof that may be grafted according to the above embodiment include, without limitation, polystyrene, poly(methyl methacrylate), olefins, LDPE, HDPE, LLDPE, polypropylene, nylons, polyesters, polyethers, polyetherimides, polyisobutylene, polyacrylonitrile, poly (vinyl chloride), poly(vinyl acetate), polyisoprene, polyamides, polyurethanes, polysiloxanes, polycarbonates, poly($\epsilon$-caprolactam), phenolic polymers, and vinyl polymers.

To assist in the grafting reaction, it is preferred to employ an initiator, the selection of which is known in the art. Examples of initiators include, without limitation, initiators selected from the group consisting of acetylcyclohexanesulfonyl peroxide; diacetyl peroxydicarbonate; dicyclohexyl peroxydicarbonate; di-2-ethylhexyl peroxydicarbonate; tert-butyl pemeodecanoate; 2,2'-azobis(methoxy-2,4-dimethylvaleronitrile); tert-butyl perpivalate; dioctanoyl peroxide; dilauroyl peroxide; 2,2'-azobis(2,4-dimethylvaleronitrile); tert-butylazo-2-cyanobutane; dibenzoyl peroxide; tert-butyl per-2-ethylhexanoate; tert-butyl permaleate; 2,2-azobis(isobutyronitrile); bis(tert-butylperoxy) cyclohexane; tert-butyl peroxyisopropylcarbonate; tert-butyl peracetate; 2,2-bis(tert-butylperoxy)

butane; dicumyl peroxide; ditert-amyl peroxide; di-tert-butyl peroxide; p-methane hydroperoxide; pinane hydroperoxide; cumene hydroperoxide; tert-butyl hydroperoxide, and combinations thereof. The initiator may be employed in various amounts. In a preferred embodiment, the initiator is present in an amount ranging from about 0.01 percent to about 2.0 percent based on the weight of either the carbon dioxide-containing fluid, the oligomer, or polymer.

The grafting reaction preferably takes place at a temperature ranging from about 45° C. to about 200° C. and a pressure ranging from about 50 bar to about 400 bar.

In another embodiment of the invention, the at least one reactant is hydrogen and the at least one polymer, oligomer, or combination thereof reacts with the at least one reactant to become hydrogenated.

Various polymers, oligomers, or combinations thereof may be hydrogenated by the method of the present invention. Examples include, without limitation, polystyrene, poly(bisphenol A carbonate), poly(ethylene terephthalate), poly(butylene terephthalate), polyisoprene, polybutadiene, poly($\alpha$-methylstyrene), poly(methacrylates) and copolymers made from at least one monomer containing an aromatic ring or more than one double bond.

Hydrogen gas may be employed under a number of conditions for the purposes of the invention. For example, hydrogen is preferably employed at a pressure ranging from about 100 psig to about 4000 psig and at a temperature ranging from about 25° C. to about 300° C.

In one embodiment, the hydrogenation reaction takes place in the presence of an appropriate catalyst. Exemplary catalysts include, without limitation, rhodium, nickel, copper, chromium, ruthenium, platinum, palladium, rhenium, and combinations thereof. As described herein, the catalyst can be employed on a stationary support in the extruder. For example, screens fabricated from the desired catalytic metal may be placed in sections of the extruder barrel that do not contain rotating screws, but through which molten polymer is being forced by screws upstream of the section containing the catalytic metal screens. The catalyst may also be dispersed in the polymer in the form of small particles that travel through the extruder with the polymer. The particles may contain from 0.1 to 10 weight % of the catalytic metal dispersed on an inorganic support such as alumina, silica or titania. The catalyst can be employed in various amounts. When dispersed in the polymer, the catalyst may be present in a proportion of from 0.1 to 10 weight %. When used as a screen that is fixed into the extruder, the amount of catalyst is such that the ration of polymer flow to catalyst is between 1 and 10,000 liters/gr catalyst hr.

The ratio of $H_2$ flow to polymer flow depends on the number of double bonds to be saturated per weight of polymer. The ratio of $H_2$ molecules to bonds to be hydrogenated is in the range of 1 to 10.

In another aspect of the invention, the at least one reactant is a second polymer, oligomer, or combination thereof which reacts with the at least one polymer, oligomer, or combination thereof to form a third polymer, oligomer, or combination thereof. In one embodiment, the second polymer, oligomer, or combination thereof is the same as the at least one polymer oligomer, or combination thereof, and wherein the third polymer, oligomer, or combination thereof results from a step growth reaction between the at least one and the second polymer, oligomer, or combination thereof, and wherein a condensate molecule is formed as a result of the reaction. In this example, the carbon dioxide-containing fluid comprises the condensate molecule and the method further comprising the step of removing the carbon dioxide-containing fluid from the extruder.

The third polymer, oligomer, or combination thereof may be selected from a number of components. Step-growth polymers that produce a condensate molecule are preferred. Non-limiting examples of such components include, without limitation, poly(ethylene terephthalate), poly(butylene terephthalate), poly(bisphenol A carbonate), nylon 6,6, polycaprolactone, polyamides, polyesters, polycarbonates and polyimides.

The condensate molecule that is formed as a result of the above method is typically one that is selected from, without limitation, a phenol, a glycol, a $C_1$ to $C_8$ alcohol, water, acetic acid, and mixtures thereof, as well as others. Optionally, a catalyst maybe added to fluid mixture to increase the rate of reaction between the at least one and the second polymer, oligomer, or combination thereof. Examples of catalysts that may be employed include, but are not limited to, lithium hydroxide, sodium hydroxide, potassium hydroxide, cesium hydroxide, magnesium hydroxide, barium hydroxide, and various amines, including quaternary amines. Mixtures of the above catalysts can also be employed.

The amount of catalyst may vary. In a preferred embodiment, the catalyst amount ranges from about 0.001 to 2.0 percent based on weight of the polymer. It should be appreciated that other amounts can also be used.

The third polymer, oligomer, or combination thereof formed by the above method may vary in molecular weight. In one preferred embodiment, the third polymer, oligomer, or combination thereof has a weight average molecular weight ranging from about 10,000 to about 250,000.

In other embodiments, the at least one polymer, oligomer, or combination thereof is different from the second polymer, oligomer, or combination thereof, and accordingly the third polymer, oligomer, or combination thereof is a copolymer. Preferably, the third polymer, oligomer, or combination thereof is a block copolymer.

A number of monomers can be employed in forming the block copolymer in accordance with the invention. In various embodiments, for example, the block copolymer is formed from monomers selected from the group consisting of terephthalic acid, 1,4 butanediol, ethylene glycol, dimethyl terephthalate, propylene glycol, diphenyl carbonate, bisphenol A, adipic acid, and hexamethylenne diamine, and combinations thereof. Other monomers can also be employed.

Preferred block copolymers are selected from the group consisting of polypropylene-polyamide, styrene-butadiene, styrene-butadiene-acrylonitrile, polypropylene-polyethylene, styrene-acrylonitrile.

In another embodiment, the third polymer, oligomer, or combination thereof is a graft copolymer. Examples of graft copolymer include, without limitation, polypropylene-g-polyamide. In other embodiments, a co-polymer may be formed by a reactive blending process. In such embodiments, two or more polymers, oligomers, or combinations thereof that are chemically and physically dissimilar. The term "chemically dissimilar" refers to polymers, oligomers, or combinations thereof of different chemical structure. The term "physically dissimilar" refers to polymers, oligomers, or combinations thereof having different physical properties (e.g., molecular weight) even though such materials may or may not be chemically similar. Both block and graft co-polymers can be formed by such a process. Active sites on the at least tow polymers which provides for the formation of covalent bonds therebetween can be achieved by various techniques. In one embodiment, for example, the covalent bond formation can be achieved by employing a crosslinking agent between the at least two polymers, oligomers, or combinations thereof. Examples of suitable crosslinking agents include, without limitation, diisobutyryl peroxide, acetyl cyclohexyl sulfonyl peroxide, dibenzyl peroxydicarbonate, di-(2-ethylhexyl) peroxydicarbonate, dicyclohexyl peroxydicarbonate, di(sec-butyl)peroxy dicarbonate, diisopropyl peroxy dicarbonate, 2,4-dichlorobenzoyl peroxide, t-butyl peroxypivalate, isononanoyl peroxide, decanoyl peroxide, lauroyl peroxide, propionyl peroxide, 1,1,3,3-tetramethylbutyl peroxy-2-ethyl hexanoate, acetyl peroxide, succinic acid peroxide, t-butyl peroctoate, benzoyl peroxide, t-butyl peroxy isobutyrate, t-butyl peroxymaleic acid, 1-hydroxy-1-hydroperoxydicyclohexyl peroxide, 1,1-bis(t-butylperoxy)-3,3,5-trimethylcyclohexane, t-butyl peroxycrotonate, 2,2-bis-(t-butylperoxy butane), t-butylperoxy isopropyl carbonate, 2,5-dimethyl-2,5-bis-(benzoylperoxy) hexane, t-butyl peracetate, methyl ethyl ketone peroxides, di t-butyl diperoxy phthalate, t-butyl perbenzoate, dicumyl peroxide, bis(t-butylperoxy) diisopropyl benzene, 2,5-dimethyl-2,5-di (t-butylperoxy) hexane, 2,4-pentanedione peroxide, di t-butyl peroxide, 2,5-dimethyl-2,5-di-(t-butylperoxy hexyne-3,1,1,3,3tetramethyl butyl hydroperoxide, cumene hydroperoxide, 2,5-dimethyl-2,5-di (hydroperoxy) hexane, t-butyl hydroperoxide, and mixtures thereof. Additionally, in other embodiments, the third polymer formed as a result of use of a crosslinking agent may be present in the form of a crosslinked polymer network.

In another embodiment, reactive sites may be introduced onto the polymers utilizing an appropriate technique, and the block or graft co-polymers can then be formed with the assistance in the carbon dioxide containing fluid using an appropriate technique In certain embodiments, the mixture further comprises a compatibilizing agent which is attached to each of the polymer, oligomer, or combination thereof and the second polymer, oligomer, or combination thereof. Preferred compatibilizing agents include, without limitation, peroxides, azo radicals, stable free radicals, persulfides, surfactants, and copolymers and mixtures thereof.

The polymers, oligomers, or combinations thereof which are formed or modified by any of the aspects of the present invention may also include additional components. One example of such a component is a filler. Exemplary fillers include, without limitation, alumina trihydrate, barium sulfate, wollastonite, magnesium hydroxide, calcium carbonate, and combinations thereof.

In another embodiment, the invention comprises a method of carrying out a reactive extrusion process comprising combining at least one first reactive component, at least one second reactive component, and a carbon dioxide containing fluid in an extruder to form a mixture such that the carbon dioxide containing fluid comes into intimate contact with the at least one first reactive component and the at least one second reactive component to assist in a reaction between the at least one first reactive component and the at least one second reactive component, and wherein the at least one first reactive component and the at least one second reactive component react and form a product therefrom.

In this embodiment of the invention, it is preferred that the reaction between the at least one first and second reactive components is a condensation reaction.

Various reactants may be employed for the first and second reactants of the present invention. Exemplary reactants include, without limitation, is an epoxy, an amine, and a carboxylic acid.

Exemplary epoxies are of the formula:

wherein $R_2$ is a substituent selected from the group consisting of alkyl (e.g., C1–C20 alkyl), vinyl, allyl, alkyl(meth)acrylate (e.g., C1–C8 alkyl(meth)acrylate), and aryl.

Exemplary amines are of the formula:

wherein $R_1$ is a substituent selected from the group consisting of alkyl (e.g., C1–C20 alkyl), vinyl, allyl, alkyl(meth)acrylate (e.g., C1–C8 alkyl(meth)acrylate), and aryl.

Exemplary carboxylic acids are of the formula:

wherein $R_3$ is a substituent selected from the group consisting of alkyl (e.g., C1–C20 alkyl), vinyl, allyl, alkyl(meth)acrylate (e.g., C1–C8 alkyl(meth)acrylate), and aryl.

The invention also provides polymers, oligomers, and combinations thereof formed by any of the methods described herein.

Figure 1:
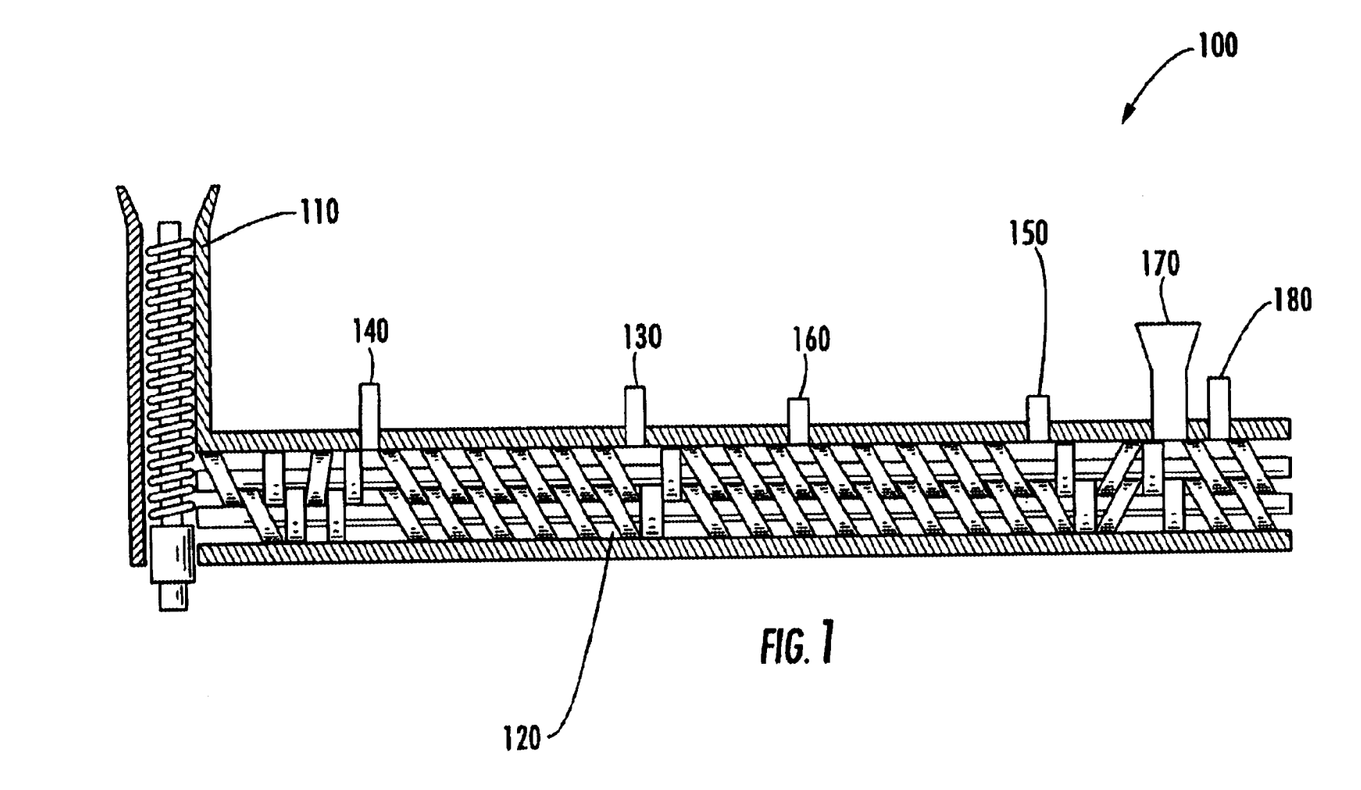
FIG. 1 illustrates an extrusion system for carrying out the present invention.

One embodiment of an extrusion system for carrying out the invention is illustrated in FIG. 1 as 100. The extrusion system 100 includes a single-screw vertical feeder 110 for feeding polymer, oligomer, or mixtures thereof into the system. This material is typically fed in solid form, and is heated until it is present in molten form upon entry into the main twin-screw extruder 120. The molten material then contacts carbon dioxide containing fluid in countercurrent fashion. In particular, the carbon dioxide containing fluid can enter through inlet port 130 and exit through outlet port 140, and/or enter through inlet port 150 and exit through outlet port 160. It should also be appreciated that other configurations can be employed for the purposes of the invention such as a cocurrent configuration by which carbon dioxide contacts the polymer, oligomer, or mixtures thereof.

The polymer, oligomer, or combination thereof undergoes a reaction as it is fed along the twin-screw extruder 120. Vent stuffer 170 serves to degas carbon dioxide-containing fluid from the reacted product and is also configured to force reacted product down into the twin-screw extruder 120. The vent stuffer 170 can be configured to assist in the formation of a foamed or solid reacted product, depending on the final intentions of the end user. The reacted product subsequently encounters vacuum vent 180 which also serves to expel carbon dioxide or other volatile components from the extruder.

Depending on the nature of the reaction involved during extrusion, various reactants, agents, components, additives, and the like may be introduced into the twin-screw extruder 120 at various locations. For example, in embodiments encompassing grafting reactions, the grafting agent and/or initiator are preferably introduced via inlet ports 130 and/or 150. Additionally, such components may be introduced through feeder 110.

With respect to embodiments relating the hydrogenation reactions, catalyst may be employed in a number of respects.

As stated herein above, the catalyst may be employed on a fixed support in the extruder 120, or it may be employed in a dispersed fashion. If the catalyst is dispersed, it may be introduced in either or both of inlet ports 130 and/or 150 or with the polymer in 110. Regarding the hydrogen, it also may be fed using either or both inlet ports, and it can be fed along with or separate from the carbon dioxide containing fluid.

With respect to step-growth reactions, carbon dioxide and other component(s) that may be employed may feed into extruder 120 in any manner disclosed herein. Condensate formed as a result of the step growth reaction may be removed through either or both outlet ports 140 and 160.

Regarding the formation of block or graft copolymers, appropriate components (e.g., crosslinking agents and compatibilizing agents) may be introduced into the extrusion system 100 through feed 110, or through either or both of inlet ports 140 and 160.

In addition to the above description, the methods of the invention may be carried out by employing equipment that is known to the skilled artisan. A commercially preferred multi-component system is a Leistritz twin screw extruder made commercially available by American Leistritz Extruder Corporation of Somerville, N.J. Such an extruder serves as the main barrel for mixing, compounding, and/or reaction as described above. This extruder is preferably fed by a single screw extruder which serves to melt the feed polymer and meter it into the main twin screw. A melt seal is thereby created at the beginning of the main twin screw extruder barrel. A second melt seal is then created near the end of the main twin screw extruder barrel to trap high pressure gas (e.g., reactants, solvents, etc.) inside the twin screw barrel. This design allows flexibility in controlling residence time, reaction time, high shear mixing and compounding.

The above-mentioned embodiment also preferably employs a Leistritz, twin screw vent stuffer made commercially available by American Leistritz Extruder Corporation of Somerville, N.J. A second (vacuum) vent also preferably is included on the main barrel, after the vent with the stuffer, to insure adequate removal of undesired volatile components. The combination of the vacuum vent and the twin screw vent stuffer will allow either foamed or solid material to be produced and has the ability to help control the final morphology of the extruded products. In addition to these vents, auxiliary gas inlet and outlet ports may be optionally positioned along the barrel of the main twin screw extruder to allow for both high pressure gas injection and removal in any desired configuration (i.e. co- or counter-current flow patterns).

The embodiment of the system employed in the invention may include other components. For example, a volumetric metering feeder may be employed to precisely set and control the polymer and/or oligomer feed rate to the extruder system. The volumetric feeder preferably utilizes a dual screw auger with an agitated hopper and is designed to feed pellet, powder, flake, or other non free-flowing feedstocks. A standard pelletizing package also can be employed. This package consists of two main components, a water trough and a strand pelletizer. If employed, these pieces of equipment are positioned directly after the discharge end of the main twin screw extruder. The water trough cools the extrudate and feeds it directly to the pelletizer. The strand pelletizer then cuts the extrudate strand into pellets having a predetermined size (e.g., 1/8 inch) for collection and analysis. The system may also include a PC-based Lab View data acquisition and monitoring system. Such a data and monitoring system allows the extrusion line to be interconnected to a stand alone monitoring station. Parameters that may be monitored include screw rpm, temperature zones, melt pressures, melt temperature, motor amps and feeders.

It should be appreciated that variations of the embodiments may be employed without departing from the spirit and scope of the invention.

The invention will now be described in reference to the claims that follow. It should be understood that these embodiments presented herein do not limit the scope of the claims, but are set forth for illustrative purposes.

That which is claimed:

1. A method of carrying out a reactive extrusion process, said method comprising:
   combining at least one polymer, oligomer, or combination thereof, a carbon dioxide containing fluid, and at least one reactant in an extruder to form a mixture such that the carbon dioxide containing fluid comes into intimate contact with the at least one polymer, oligomer, or combination thereof and assists in a reaction between the at least one polymer, oligomer, or combination thereof and the at least one reactant, and wherein the at least one polymer, oligomer, or combination thereof is modified upon reaction with the at least one reactant.

2. The method according to claim 1, wherein the carbon dioxide containing fluid comprises supercritical carbon dioxide.

3. The method according to claim 1, wherein the carbon dioxide containing fluid comprises liquid carbon dioxide.

4. The method according to claim 1, wherein the carbon dioxide containing fluid comprises gaseous carbon dioxide.

5. The method according to claim 1, wherein the extruder is a twin-screw extruder.

6. The method according to claim 1, wherein the extruder is a single-screw extruder.

7. The method according to claim 1, wherein the at least one polymer, oligomer, or combination thereof and the carbon dioxide-containing fluid contact each other in a countercurrent configuration.

8. The method according to claim 1, wherein the at least one polymer, oligomer, or combination thereof and the carbon dioxide-containing fluid contact each other in a cocurrent configuration.

9. The method according to claim 1, further comprising the step of removing the carbon dioxide-containing fluid from the extruder.

10. The method according to claim 9, wherein the modified at least one polymer, oligomer, or combination thereof exits the extruder as a foamed material.

11. The method according to claim 9, wherein the modified at least one polymer, oligomer, or combination exits the extruder as a solid, unfoamed material.

12. The method according to claim 1, wherein the carbon dioxide-containing fluid further comprises a surfactant and wherein the at least one reactant enters the extruder with the carbon dioxide-containing fluid.

13. The method according to claim 1, wherein the at least one reactant is a grafting agent, and wherein the grafting agent is grafted onto the at least one polymer, oligomer, or combination thereof.

14. The method according to claim 13, wherein the grafting agent is selected from the group consisting of vinyl silanes, acrylic acid, acrylic esters, methacrylic acid, butyl acrylate, ethylhexyl acrylate, mixtures of acrylic acid and acrylates, dimethylamino ethyl methacrylate, hydroxyethyl methacryate, vinyl acetate, mixtures of vinyl acetate, maleic anhydride, p-methoxy acrylate, p-fluoro acrylate, p-cumylphenyl acrylate, N-methylacryloyl caprolactan, acrylonitrile, aryl vinyl monomers, fumaric acid, itaconic acid, citraconic acid, citraconic anhydride, alkenyl succinic anhydrides, dibutyl maleate, phenyl fumarate, nonoethyl maleate, fluorinated derivatives thereof, and mixtures thereof.

15. The method according to claim 13, wherein the mixture further comprises an initiator.

16. The method according to claim 15, wherein the initiator is selected from the group consisting of acetylcyclohexanesulfonyl peroxide; diacetyl peroxydicarbonate; dicyclohexyl peroxydicarbonate; di-2-ethylhexyl peroxydicarbonate; tert-butyl peroxydicarbonate; 2,2'-azobis (methoxy-2,4-dimethylvaleronitrile); tert-butyl perpivalate; dioctanoyl peroxide; dilauroyl peroxide; 2,2'-azobis(2,4-dimethylvaleronitrile); tert-butylazo-2-cyanobutane; dibenzoyl peroxide; tert-butyl per-2-ethylhexanoate; tert-butyl permaleate; 2,2-azobis(isobutyronitrile); bis(tert-butylperoxy) cyclohexane; tert-butyl peroxyisopropylcarbonate; tert-butyl peracetate; 2,2-bis(tert-butylperoxy) butane; dicumyl peroxide; ditert-amyl peroxide; di-tert-butyl peroxide; p-methane hydroperoxide; pinane hydroperoxide; cumene hydroperoxide; tert-butyl hydroperoxide, and combinations thereof.

17. The method according to claim 1, wherein the at least one reactant is hydrogen and wherein the at least one polymer, oligomer, or combination thereof reacts with the at least one reactant to become hydrogenated.

18. The method according to claim 17, wherein the at least one polymer, oligomer, or combination thereof is selected from the group consisting of polystyrene, poly(bisphenol A carbonate), poly(ethylene terephthalate), poly(butylene terephthalate), polyisoprene, polybutadiene, poly($\alpha$-methylstyrene), poly(methacrylates) and copolymers made from at least one monomer containing an aromatic ring or more than one double bond.

19. The method according to claim 1, wherein the at least one reactant is a second polymer, oligomer, or combination thereof which reacts with the at least one polymer, oligomer, or combination thereof to form a third polymer, oligomer, or combination thereof.

20. The method according to claim 19, wherein the second polymer, oligomer, or combination thereof is the same as the at least one polymer, oligomer, or combination thereof, and wherein the third polymer, oligomer, or combination thereof results from a step growth reaction between the at least one and the second polymer, oligomer, or combination thereof, and wherein a condensate molecule is formed as a result of the reaction, the carbon dioxide-containing fluid comprising the condensation molecule and said method further comprising the step of removing the carbon dioxide-containing fluid from the extruder.

21. The method according to claim 20, wherein the third polymer, oligomer, or combination thereof is selected from the group consisting of poly(ethylene terephthalate), poly (butylene terephthalate), poly(bisphenol A carbonate), nylon 6,6, polycaprolactone, polyamides, polyesters, polycarbonates and polyimides.

22. The method according to claim 20, wherein the condensate molecule is selected from the group consisting of a phenol, a glycol, a $C_1$ to $C_8$ alcohol, water, acetic acid, and mixtures thereof.

23. The method according to claim 20, wherein the third polymer, oligomer, or combination thereof has a weight average molecular weight ranging from about 10,000 to about 250,000.

24. The method according to claim 20, wherein the at least one polymer, oligomer, or combination thereof is different from the second polymer, oligomer, or combination thereof, and wherein the third polymer, oligomer, or combination thereof is a copolymer.

25. The method according to claim 24, wherein the third polymer, oligomer, or combination thereof is a block copolymer.

26. The method according to claim 25, wherein the block copolymer is formed from monomers selected from the group consisting of terephthalic acid, 1,4 butadediol, ethylene glycol, dimethyl terephthalate, propylene glycol, diphenyl carbonate, bisphenol A, adipic acid, and hexamethylene diamine, and combinations thereof.

27. The method according to claim 19, wherein the mixture further comprises a compatibilizing agent which is attached to each of the polymer, oligomer, or combination thereof and the second polymer, oligomer, or combination thereof.

28. The method according to claim 27, wherein the compatibilizing agent is selected from the group consisting of peroxides, azo radicals, stable free radicals, persulfides, surfactants, and copolymers and mixtures thereof.

29. The method according to claim 19, wherein the mixture further comprises a crosslinking agent, and wherein the polymers, oligomers, or combinations thereof are dissimilar and the crosslinking agent attaches to each of the polymers, oligomrs, or combinations thereof to form a third-polymer.

30. The method according to claim 29, wherein the third polymer is a graft copolymer.

31. The method according to claim 29, wherein the third polymer is a crosslinked polymer network.

32. The method according to claim 1, wherein the at least one modified polymer, oligomer, or combination thereof comprises a filler.

33. The method according to claim 32, wherein the filler is selected from the group consisting of alumina trihydrate, barium sulfate, wollastonite, magnesium hydroxide, calcium carbonate, and combinations thereof.

34. A polymer, oligomer, or combination thereof formed by a method according to claim 1.

35. A method of carrying out a reactive extrusion process, said method comprising:

combining at least one first reactive component, at least one second reactive component, and a carbon dioxide containing fluid in an extruder to form a mixture such that the carbon dioxide containing fluid comes into intimate contact with the at least one first reactive component and the at least one second reactive component to assist in a reaction between the at least one first reactive component and the at least one second reactive component, and wherein the at least one first reactive component and the at least one second reactive component react and form a product therefrom.

36. The method according to claim 35, wherein the reaction between the at least one first and second reactive components is a condensation reaction.

37. The method according to claim 35, wherein the at least first reactive component is an epoxy, and the at least one second reactive component is an amine or a carboxylic acid.

38. The method according to claim 37, wherein the epoxy is of the formula:

wherein $R_2$ is a substituent selected from the group consisting of alkyl, vinyl, allyl, alkyl(meth)acrylate, and aryl.

39. The method according to claim 37, wherein the amine is of the formula:

wherein $R_1$ is a substituent selected from the group consisting of alkyl, vinyl, allyl, alkyl(meth)acrylate, and aryl.

40. The method according to claim 37, wherein the carboxylic acid is of the formula:

wherein $R_3$ is a substituent selected from the group consisting of alkyl, vinyl, allyl, alkyl(meth)acrylate, and aryl.

41. A product formed by a method according to claim 35.

* * * * *

UNITED STATES PATENT AND TRADEMARK OFFICE
CERTIFICATE OF CORRECTION

PATENT NO. : 6,900,267 B2
DATED : May 31, 2005
INVENTOR(S) : Royer et al.

It is certified that error appears in the above-identified patent and that said Letters Patent is hereby corrected as shown below:

Title page,
Item [74], *Attorney, Agent, or Firm*, should read -- Myers Bigel Sibley & Sajovec, P.A. --.

Column 13,
Line 12, should read -- carbonate; tert-butyl perneodecanoate; 2, 2'-azobis --.

Column 14,
Line 29, should read -- polymers, oligomers, or combinations thereof to form a --.

Signed and Sealed this

Twenty-seventh Day of September, 2005

JON W. DUDAS
*Director of the United States Patent and Trademark Office*